(12) United States Patent
Cunningham

(10) Patent No.: US 7,408,445 B1
(45) Date of Patent: Aug. 5, 2008

(54) PROXIMITY ACTIVATED VEHICLE SIGNALING SYSTEM

(76) Inventor: Bill Cunningham, 12278 SW. 131 Ave., Miami, FL (US) 33186

( * ) Notice: Subject to any disclaimer, the term of this patent is extended or adjusted under 35 U.S.C. 154(b) by 0 days.

(21) Appl. No.: 11/064,407

(22) Filed: Feb. 23, 2005

(51) Int. Cl.
*B60Q 1/00* (2006.01)
*G08B 23/00* (2006.01)
*G08B 21/00* (2006.01)
*B60K 28/00* (2006.01)
*B60R 25/00* (2006.01)

(52) U.S. Cl. .............. 340/425.5; 340/457; 340/457.1; 340/459; 340/573.1; 340/686.1; 340/686.4; 180/271; 180/272; 180/286; 180/287

(58) Field of Classification Search .............. 340/425.5, 340/433, 435–436, 457, 457.1, 539.1, 540, 340/573.1, 459, 686.4; 180/271–272, 286–287
See application file for complete search history.

(56) References Cited

U.S. PATENT DOCUMENTS

| | | | | |
|---|---|---|---|---|
| 4,151,509 A | * | 4/1979 | Winiczei | 307/10.4 |
| 4,223,296 A | * | 9/1980 | Kim et al. | 340/457 |
| 4,897,630 A | * | 1/1990 | Nykerk | 340/426.25 |
| 5,015,991 A | * | 5/1991 | Barr | 340/456 |
| 5,243,323 A | * | 9/1993 | Rogers | 340/433 |
| 5,874,891 A | * | 2/1999 | Lowe | 340/433 |
| 5,939,988 A | | 8/1999 | Neyhart | |
| 5,949,340 A | | 9/1999 | Rossi | |
| 6,104,293 A | * | 8/2000 | Rossi | 340/573.1 |
| 6,107,915 A | * | 8/2000 | Reavell et al. | 340/433 |
| 6,259,362 B1 | * | 7/2001 | Lin | 340/457 |
| 6,353,383 B1 | | 3/2002 | Gross et al. | |
| 6,489,889 B1 | * | 12/2002 | Smith | 340/457 |
| 6,535,137 B1 | * | 3/2003 | Ryan | 340/687 |
| 6,714,132 B2 | | 3/2004 | Edwarsd et al. | |
| 6,737,964 B2 | * | 5/2004 | Samman et al. | 340/436 |
| 6,768,420 B2 | | 7/2004 | McCarthy et al. | |
| 6,812,833 B2 | * | 11/2004 | Rothkop et al. | 340/475 |
| 6,819,249 B1 | | 11/2004 | Papp | |
| 6,922,147 B1 | * | 7/2005 | Viksnins et al. | 340/573.1 |
| 2003/0062996 A1 | * | 4/2003 | Flanagan et al. | 340/457 |
| 2003/0222775 A1 | * | 12/2003 | Rackham et al. | 340/457 |
| 2006/0061201 A1 | * | 3/2006 | Skinner | 297/468 |

* cited by examiner

*Primary Examiner*—Benjamin C. Lee
*Assistant Examiner*—Lam Pham
(74) *Attorney, Agent, or Firm*—Malloy & Malloy, P.A.

(57) ABSTRACT

A system for generating a reminder signal to one or more individuals exiting a vehicle for purposes of preventing the inadvertent leaving of a child, pet or other object therein. A sensor assembly monitors the presence of an individual within a predetermined proximity area and actuates an alarm assembly so as to generate a demonstrable reminder signal of significant intensity. A control assembly operatively connected to the sensor assembly comprises both arming and shut-off capabilities which are automatically and/or manually operable, respectively, to activate and deactivate the sensor assembly. In operation, the sensor assembly will cause the alarm assembly to generate the reminder signal upon the passage of one or more individuals out of the predetermined proximity area thereby forcing a return to the vehicle to deactivate the system, wherein the interior of the vehicle is readily observable to determine the existence of an inadvertently left object.

14 Claims, 4 Drawing Sheets

PROXIMITY ACTIVATED VEHICLE SIGNALING SYSTEM

BACKGROUND OF THE INVENTION

1. Field of the Invention

This invention is directed to a system associated with an automobile or like motor vehicle which is operative to generate a reminder signal to one or more individuals upon leaving the vehicle and passing beyond a predetermined proximity area from the vehicle. The reminder signal is of sufficient intensity to force a return to the vehicle for the manual deactivation of the system, during which time the interior of the vehicle will be observed for inadvertently left objects, including children, pets, etc.

2. Description of the Related Art

Many aspects and activities associated with today's active lifestyle are conducted at a hectic pace. As such, many activities are conducted on a rush basis when compared to the pace of a person's lifestyle in past years. Perhaps the most common evidence of today's hurried lifestyle is the popularity and predominance of "fast food" outlets. This industry provides a clear indication that many individuals do not even take time out to eat regular meals in reasonably allotted time periods.

However, a more important characteristic of a modern society is demonstrated by the forgetfulness of individuals when their focus is directed to any one or more activities, business, conversations, mobile telephone communications, etc. The tragic consequence of such forgetfulness is all too often indicated by a vehicle operator inadvertently leaving infants, small children and/or pets within the interior of a closed and locked vehicle after the operator or other individual has departed therefrom. It is well known that the temperature in a closed, sealed vehicle can rapidly rise to a level which will cause death or serious injury to a living thing left therein. Such rapid temperature rise is commonplace even in geographical locations enjoying a more temperate environment. However, when the outside temperature is significantly higher, death or serious injury can result when a child or pet is left within a closed vehicle, even for a matter of a few minutes.

Attempts to overcome the terrible consequences of such forgetfulness have resulted in numerous alarm and/or signaling devices being devised for automobiles or other passenger vehicles. Such known devices have a common operating characteristic of activating an alarm and/or signal for the purpose of reminding an operator or other individual associated with the vehicle that a human, animal, object, etc. has been left within the interior thereof. Naturally, such devices are primarily directed to the determination of a living thing being inadvertently left behind. As such, currently known or available systems of this type normally incorporate relatively complex and frequently expensive operative components including various types of sensing devices mounted within the vehicle and disposed and structured to determine whether or not a live object remains therein after the vehicle has been closed and/or locked. Such operative components which have been suggested include: motion sensing devices which will detect movement of a child or animal within the passenger compartment; pressure switches which serve to activate a system by determining that a child remains within a child seat or other support facility; position sensors associated with seat belts or like safety harnesses and even audio and/or video recording devices which will detect both sound and movement within the passenger compartment.

Disadvantages and problems associated with such systems include the requirement for an operator to cause and maintain the activation and operation thereof as well as sometimes requiring an operator or other individual to arm the system manually before the monitoring of the interior of the vehicle can be accomplished. Other disadvantages of known systems sometimes include an individual being forced to carry a transceiver or other communication device for operation remote from the vehicle being monitored. This latter operational requirement frequently results in the individual losing or forgetting the transceiver/communication device thereby defeating the purpose of the reminder system associated therewith.

Accordingly, there is a need in this area for a reliable, easily operable alarm and/or signaling system which is readily adaptable to vehicles of all types and which may be used in combination with the vehicle as an item of original manufacture or which can be retrofitted for use with any type of vehicle after its manufacture. Desirable features of such a proposed system should provide for the automatic "arming" or activation thereof and the generation of a demonstrable reminder signal of sufficient intensity to force a return to the vehicle in order to deactivate the system. Upon returning, the individual will be forced to examine the passenger compartment or other portions of the interior of the vehicle, even if such is done on a cursory basis. Most assuredly, the presence of a child, animal or even perishable objects will be readily apparent.

SUMMARY OF THE INVENTION

The present invention is directed to a signaling system used with an automobile or any other passenger vehicle, especially of the type which may be used to transport infants, younger children, pets, perishable objects, etc. Moreover, the system of the present invention is structured to generate a reminder signal of sufficient intensity to force the one or more individuals leaving the vehicle to return to accomplish a manual shut-off and/or deactivation of the system. During such return the individual will "automatically" observe the interior thereof and discover any "object" that has been inadvertently left behind. It is recognized that in most instances the reminder signal in and of itself will be sufficient to alert an individual of a forgotten child. However, the required return to the vehicle to manually deactivate of the alarm and/or system will assure that anything left within the interior of the vehicle will be discovered. Moreover, the signaling system of the present invention overcomes known problems and disadvantages of conventional reminder/alarm systems by being automatically activated or "armed". Such automatic activation will be achieved upon the occurrence of at least one of a possible plurality of activating conditions occurring within a predetermined proximity of the vehicle, and/or within the vehicle interior.

Accordingly, the system of the present invention comprises a sensor assembly structured to determine and react to the presence of one or more individuals passing out of and/or entering a predetermined proximity area relative to the vehicle. As such, the sensor assembly is preferably mounted within the vehicle in any one of a plurality of appropriate locations such that the aforementioned predetermined proximity area can be effectively monitored. The specific structural and operational features of the proximity sensor of the present invention may of course vary dependent, at least in part, on the size, type and/or configuration of the vehicle as well as the dimension and configuration of the proximity area being monitored.

The sensor assembly is operatively connected to an alarm assembly structured to generate a "demonstrable" reminder signal of sufficient intensity to be necessarily brought to the attention of one or more individuals leaving the vehicle. In addition, the intensity of the reminder signal should be sufficient to effectively force an individual to return to the vehicle for deactivation of the signaling system and/or sensor assembly causing a cessation of the reminder signal. To this end, the system incorporates a control assembly which includes as a part thereof, a shut-off device which is manually operable and which is disposed within the vehicle. The location of the manual shut-off device thereby necessitates a return of the individual to the interior of the vehicle during which the passenger compartment will "automatically" be observed. Any infant, animal or object will thereby be most assuredly discovered.

Another structural and operative feature of the signaling system of the present invention comprises the automatic activation or "arming" of the system. Such automatic activation occurs through the provision of an arming assembly associated with and in certain preferred embodiments considered a part of the control assembly. More specifically, the arming assembly is structured to activate the sensor assembly upon the occurrence of at least one of a plurality of predetermined activating conditions. In various preferred embodiments of the signaling system of the present invention, the aforementioned one activating condition may be the passage of an individual within the proximity area relative to the vehicle. As such, the sensor assembly, although partially deactivated and being in what may be considered a "sleep" mode will still note the passage of the operator/individual into the predetermined proximity area being monitored. When such occurs, the sensor assembly, being connected to the arming assembly will be brought up to a full activation mode thereby alleviating the vehicle operator or other individual from manual activation of the system. This automatic arming feature of the present invention further eliminates the possibility that the signaling system will remain inoperative, which would of course defeat the primary purpose of reminding one or more individuals as to the content of the interior of the vehicle.

In the various additional preferred embodiments of the present invention, the arming assembly may be further structured to react to other activating conditions either within the proximity area and/or within the interior of the vehicle. For purposes of describing the aforementioned activating conditions, the interior of the vehicle, at least to this limited extent, will be considered within the proximity area. Accordingly, the other activating conditions which may serve to activate the sensor assembly and the associated operative components of the signaling system include the entry of an operator or other individual into the interior of the vehicle. Such entry may be determined by an opening of a door, placement of an individual's weight on an appropriate passenger seat or other physical conditions occurring as the operator or individual enters the vehicle. Yet another activating condition would be operation of the ignition assembly of the vehicle. As described and intended, the operation of the ignition assembly need not be limited to an actual starting of the vehicle's engine but may be further defined by placement of the ignition key within the ignition assembly, a turning of the key to an operative but not necessarily starting orientation and/or other operating features associated with a conventional and/or customized ignition assembly of the vehicle in question.

Therefore, the signaling system of the present invention, by automatically and effectively providing a demonstrable reminder signal, wherein the signaling system may be automatically armed and manually shut-off or at least partially deactivated, overcomes many of the disadvantages and problems associated with known and/or conventional vehicle alarm and/or reminder/signaling systems. Additional advantages associated with the various embodiments of the signaling system of the present invention include convenience and simplicity by not requiring an operator to carry any type of remotely operative transceiver or communication device which may easily be left behind, lost or otherwise rendered inoperative.

Also, the automatic activation of the signaling system of the present invention assures that a meaningful reminder signal will be generated on each occasion where an operator or other individual leaves the vehicle and travels beyond the aforementioned proximity area. Further, the various preferred embodiments of the present invention may be structurally modified to be used with the alarm system presently integrated into many currently available vehicle models. Finally, placement of the various components at any appropriate location throughout the vehicle is easily accomplished thereby allowing the signaling system of the present invention to be readily adapted for "after market" installation on most, if not all, motorized, passenger vehicles.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

The present invention is directed to a signaling system for generating a vehicle reminder signal from a passenger vehicle in order to prevent the unintentional leaving of an infant, small child, pet or even perishable objects within the vehicle. Moreover, the various preferred embodiments of the signaling system of the present invention include structural and operative features which overcome many of the disadvantages and problems associated with known or conventional signaling or reminder systems for vehicles. In doing so, the present invention provides for an automatic activation or "arming" of the system by virtue of any one of a plurality of activating conditions occurring within a predetermined proximity area from the vehicle, including the interior of the vehicle itself. In addition, reliable signaling of the operator or other individual is not reliant on the possession of a remotely activated transceiver or other signaling device intended to be carried on the person of the operator.

Figure 1:
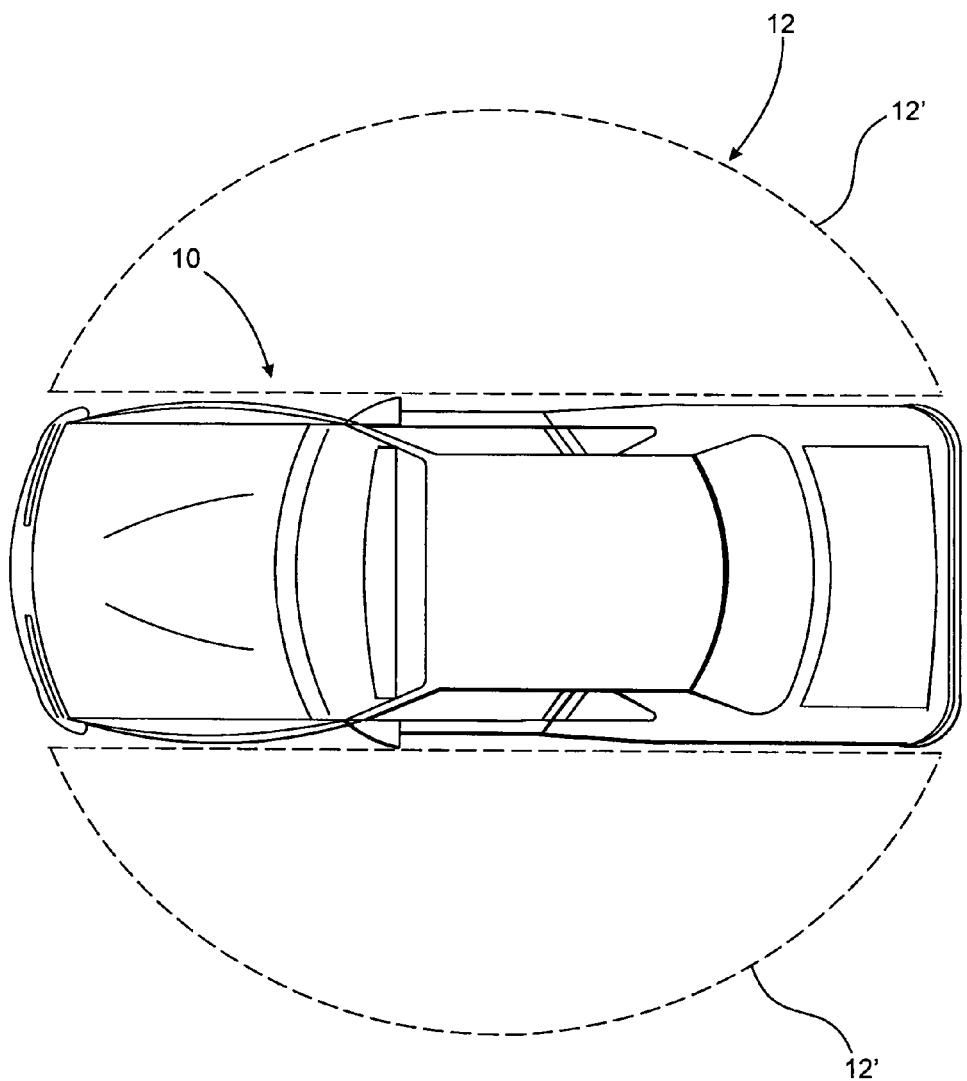
FIG. 1 is a top view of a vehicle with which the signaling system of the present invention may be used, wherein a predetermined proximity area relative to the vehicle is represented in phantom lines.
Figure 1A:
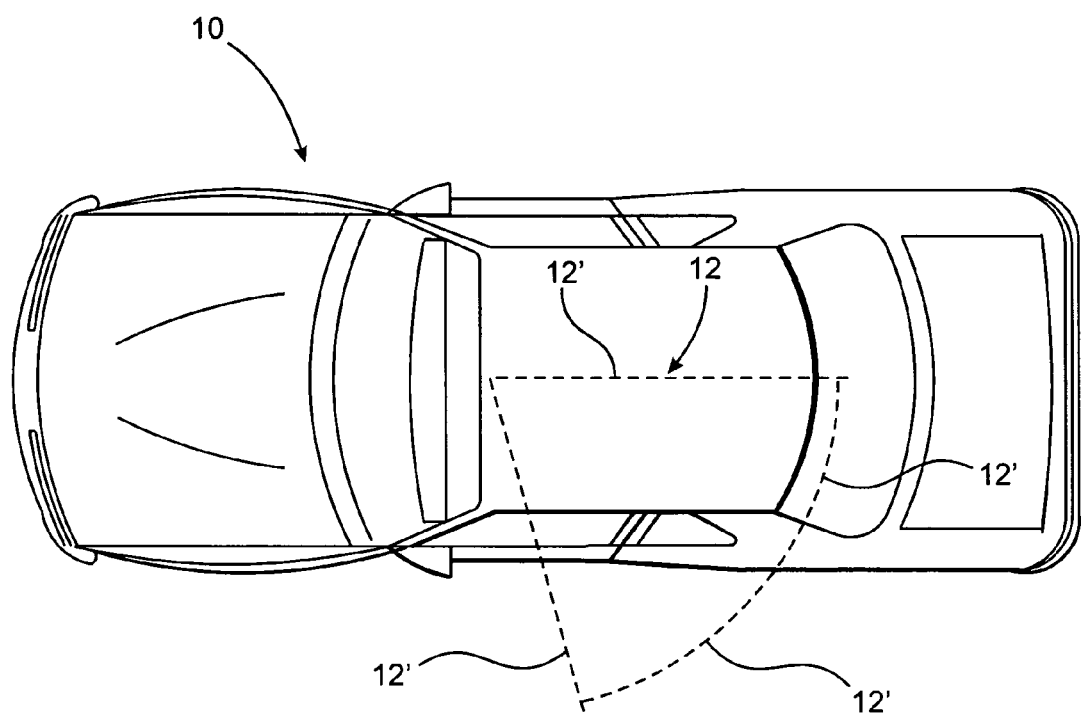
FIG. 1A is a top view of a vehicle as in FIG. 1, wherein the predetermined proximity area is schematically represented in phantom lines and varies in location, size and configuration from the predetermined proximity area represented in FIG. 1.

More specifically and with reference to the accompanying Figures, the signaling system of the present invention is used in combination with any type of passenger vehicle generally indicated as 10 including, but not limited to an automobile, van, SUV, truck or any type of vehicle having a passenger compartment or other interior area where infants in a car seat, small children, pets or perishable objects may be kept during travel. Further, a detailed explanation of the various structural and operative features of the plurality of preferred embodiments of the present invention will be described with particular reference to a proximity area, generally and schematically represented in FIGS. 1 and 1A as 12. It is emphasized that the proximity area 12 being schematically demonstrated is representative only of any of a plurality of proximity areas which radiate outwardly, from at least a portion of the vehicle 10 as demonstrated in FIG. 1 and/or which are at least partially defined on an interior portion of the vehicle as demonstrated in FIG. 1A. Clearly, the dimension, configuration and location of the proximity area 12 may vary dependent upon the size, type, style, etc. of the vehicle 10 as well as other intended operating features associated with the signaling system of the present invention.

Figure 2:
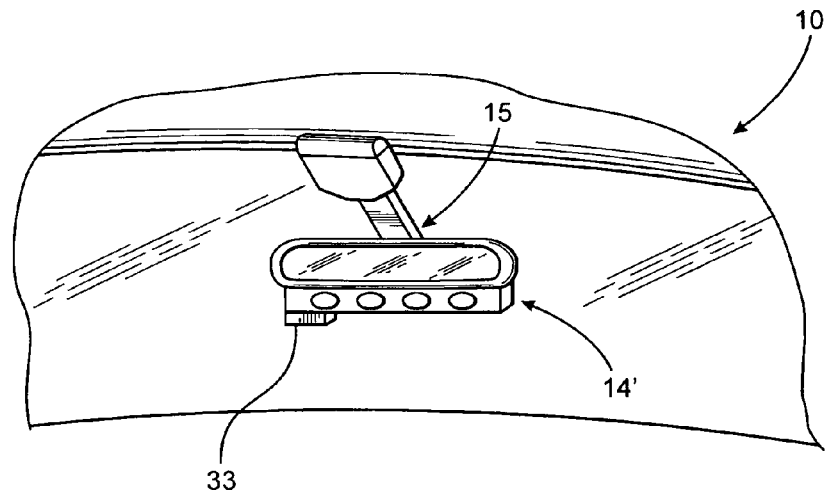
FIG. 2 is a perspective view in partial cutaway representing the interior of the vehicle and the placement of at least a portion of the signaling system of the present invention being mounted therein.
Figure 3:
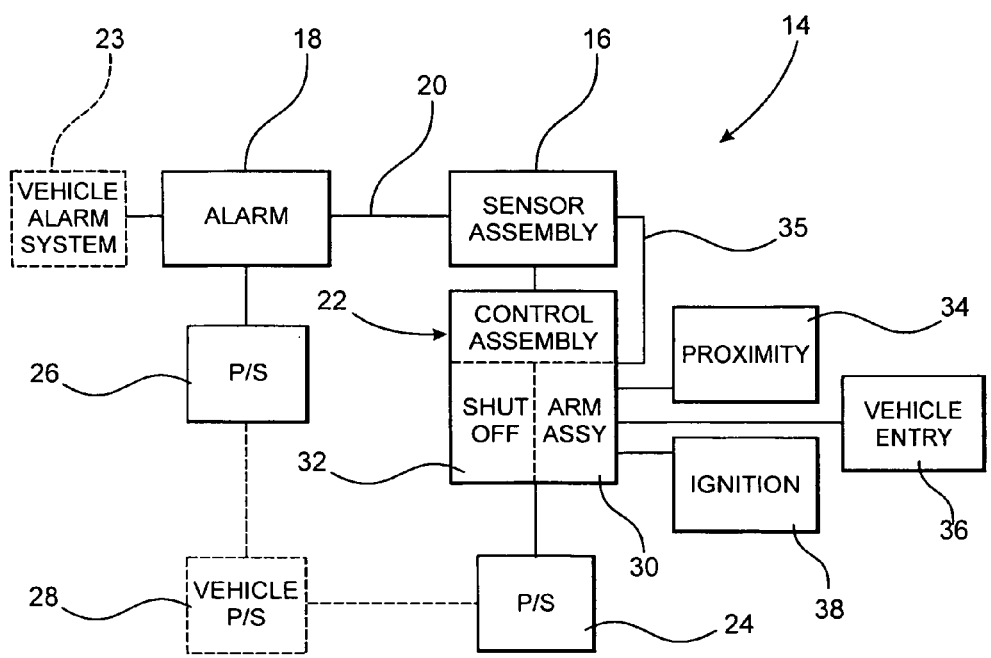
FIG. 3 is a schematic representation in block diagram form representing the various operative components of the signaling system of the present invention and their relation to one another.

With reference to FIGS. 2 and 3, the signaling system of the present invention is schematically represented in FIG. 3 and generally indicated as 14. As such, the installation of the signaling system 14 within a vehicle 10 is represented by the housing or casing 14' in FIG. 2. The casing 14' may include one or more working components of the signaling system 14, to be described in greater detail hereinafter, which are preferably located on the interior of the vehicle 10. When so positioned, the casing 14' is not limited to placement adjacent to or otherwise associated with a rear view mirror assembly 15 or any other specific locations within the vehicle 10. Clearly, the operative components of the signaling system 14 may be mounted at various locations throughout the interior of the vehicle 10. Accordingly, the housing or casing 14' may include one or more of the operative components of the signaling system 14 being disposed thereon, wherein such operative components will be described in greater detail hereinafter with specific reference to the schematic representation of FIG. 3.

More specifically, the signaling system 14 of the present invention comprises a sensor assembly 16 structured to sense and/or otherwise determine the existence of an activating condition occurring within the predetermined proximity areas 12. In a most preferred embodiment of the present invention the sensor assembly is specifically structured and disposed to determine when an operator or other individual associated with the vehicle 10 passes out of and/or beyond the proximity area 12, wherein the outer boundaries of the proximity area 12 are predefined and schematically indicated in both FIGS. 1 and 1A as 12'. Similarly, and as will be described in greater detail hereinafter, the sensor assembly 16 is structured to determine the passage of an operator or individual into the proximity area 12 from a location beyond the perimeter 12', for purposes of "arming" the signaling system 14.

The signaling system 14 further includes an alarm assembly 18 operatively connected to the sensor assembly 16 either by a hard wire connection and/or by a wireless transmission link, both of which are schematically represented as 20. Accordingly, the alarm assembly 18 is mounted on the vehicle 10 typically at some spaced apart or at least minimally remote location from the sensor assembly 16 such that a reminder signal generated by the alarm assembly 18 is readily apparent to the operator or individual leaving the proximity area 12 beyond the perimeter 12' thereof. Therefore, while the present invention is not limited to the placement of the sensor assembly 16 and the alarm assembly 18 in any specific location on the vehicle 10, at least one preferred embodiment comprises the sensor assembly 16 and a control assembly 22 being mounted within or otherwise being connected to the casing 14'. In contrast, the alarm assembly 18 is preferably located on a portion of the vehicle 10 outside of the passenger compartment so that a reminder signal generated thereby such as, but not limited to, an audible signal may be more readily apparent to one or more individuals within or adjacent to the proximity area 12.

An additional structural and operative feature of the alarm assembly 18 is its ability to generate a "demonstrable" reminder signal such as a loud sound. Further, the demonstrable reminder signal must be of such intensity so as to prevent it from being ignored by the individual passing beyond the perimeter 12' of the proximity area 12. In a most preferred embodiment, the sensor assembly 16 includes the alarm assembly 18 being an operative component thereof. However, in yet another preferred embodiment of the present invention, the signaling system 14 can be made operable with its own independent alarm assembly 18 or alternatively be operatively connected to the alarm system 23 integrated within or made a part of the vehicle 10. As is well recognized in the automobile industry, many modern day passenger vehicles come equipped with alarm systems which are primarily intended to serve as anti-theft alarms which deter unauthorized entry or use of the vehicle. Accordingly, such vehicle alarm systems 23 may include the generation or production of a loud sound such as a horn, siren, whistle, etc. in combination with or independently of the illumination or flashing of various lights associated with the vehicle.

Other operative features of the signaling system 14 include at least one but preferably one or more independent power supplies 24 and 26 associated with the sensor assembly 16, control assembly 22 and the alarm assembly 18, as indicated in FIG. 3. Also, as a viable alternative the electrical energy used to drive the sensor assembly 16, control assembly 22 and/or the alarm assembly 18 may be derived directly from the power supply 28 associated with the vehicle 10, such as the commonly present storage battery.

As set forth above, the signaling system 14 also includes a control assembly 22. The control assembly 22, in addition to operative circuitry which is not shown for purposes of clarity, also comprises an arming assembly 30 and a shut-off assembly or device 33. As set forth above, one feature of the signaling system 14 of the present invention is the ability to be automatically activated or armed upon the occurrence of at least one of a possible plurality of predetermined activating conditions 34, 36, or 38, occurring within the proximity area 12. As demonstrated in FIGS. 1 and 1A the proximity area 12 may include an exterior and/or at least a portion of the interior of the vehicle. It is therefore emphasized that with regard to the automatic arming of the signaling system 14 and/or the sensor assembly 16 as well as generating of a reminder signal, the schematically indicated interior of the vehicle in FIG. 1A will be considered a part of the proximity area 12.

Therefore, the various preferred embodiments of the signaling system 14 include the automatic arming thereof and more specifically, the arming or full activation of the sensor assembly 16 by the occurrence of at least a predetermined one of any number of activating conditions 34, 36 or 38. By way of example, one of a plurality of activating conditions may be an operator or individual entering into the proximity area 12, as at 34. Assuming that the sensor assembly 16 is at least partially deactivated or more accurately in a "sleep" mode when the vehicle is not being used, the entry of an operator or individual, preferably associated with the vehicle 10 into the proximity area 12 will be sensed by the sensor assembly 16. Entry of an individual within a predetermined proximity of the vehicle 10, such as into the proximity area 12, will thereby define the activating condition 34. Upon the occurrence of this activating condition 34, the arming assembly 30 will be signaled through its operative interconnection 35 with the sensor assembly 16. The arming assembly 30 will therefore be structured, through appropriate circuitry and other operative components to "wake up" the sensor assembly 16 into a fully activated mode. The signaling system 14 will therefore be fully activated and "armed".

Another of a plurality of possible activating conditions occurring within the proximity area 12 or the interior of the vehicle 10 includes the entry of the vehicle, as at 36. Therefore, when an operator or other authorized individual enters the vehicle 10, the arming assembly 30 through appropriate, operative circuitry will again change the sensor assembly 16 from an at least partially deactivated state or sleep mode into a fully activated mode, as set forth above. The entry of the vehicle 10 can be physically determined by an authorized opening of one of the vehicle doors, the positioning of an operator or passenger in an appropriate seat or by any one or more of a plurality of other acts which may occur by virtue of the operator or individual entering the vehicle 10.

Yet another possible one of a plurality of activating conditions is the operation of the ignition, as at 38. Accordingly, an operator may return to the vehicle 10 on a temporary basis for any number of reasons. As such, it may be undesirable to arm the system 14 and/or the sensor assembly 16 at this time. Accordingly, it may be predetermined that the activating condition may not be defined by passage into the proximity area 12, as at 34, or the entering of the vehicle 10, as at 36, but rather by the "operating" of the ignition assembly, as at 38, associated with the vehicle 10. The term "operating the ignition" is to be broadly interpreted and may include the acts of starting the engine, positioning the activating switch in a "power-on" position or merely placing the ignition key in the ignition assembly without positioning the ignition assembly in either a starting or power-on orientation.

As set forth above, the control assembly 22 further includes a shut-off assembly or device 33 which is preferably mounted on, connected to or otherwise associated with the housing or casing 14' and located on the interior of the vehicle 10 as represented in FIG. 2. As also emphasized, the reminder signal generated by the alarm assembly 18 and/or the vehicle alarm system 23 must be of sufficient intensity and therefore clearly "demonstrable" so as to not be ignored by an operator or individual passing beyond the perimeter 12' of the proximity area 12. As such, the individual will be forced to return to the vehicle 10 to at least partially deactivate the sensor assembly 16 and accordingly the signaling system 14. Therefore, the shut-off device 33 is structured to be manually operable in order to force the return of the individual or operator back to the vehicle 10. Therefore, while manually operating the shut-off device 33 on the interior of the vehicle 10, so as to at least partially deactivate the sensor assembly 16 and/or stop the generation of the reminder signal by the alarm assembly 18, the individual will also have an opportunity to observe the interior portions of the vehicle 10. The possibility of inadvertently leaving an infant, small child, pet or even a perishable object within the vehicle 10 will thereby be eliminated.

Figure 4:
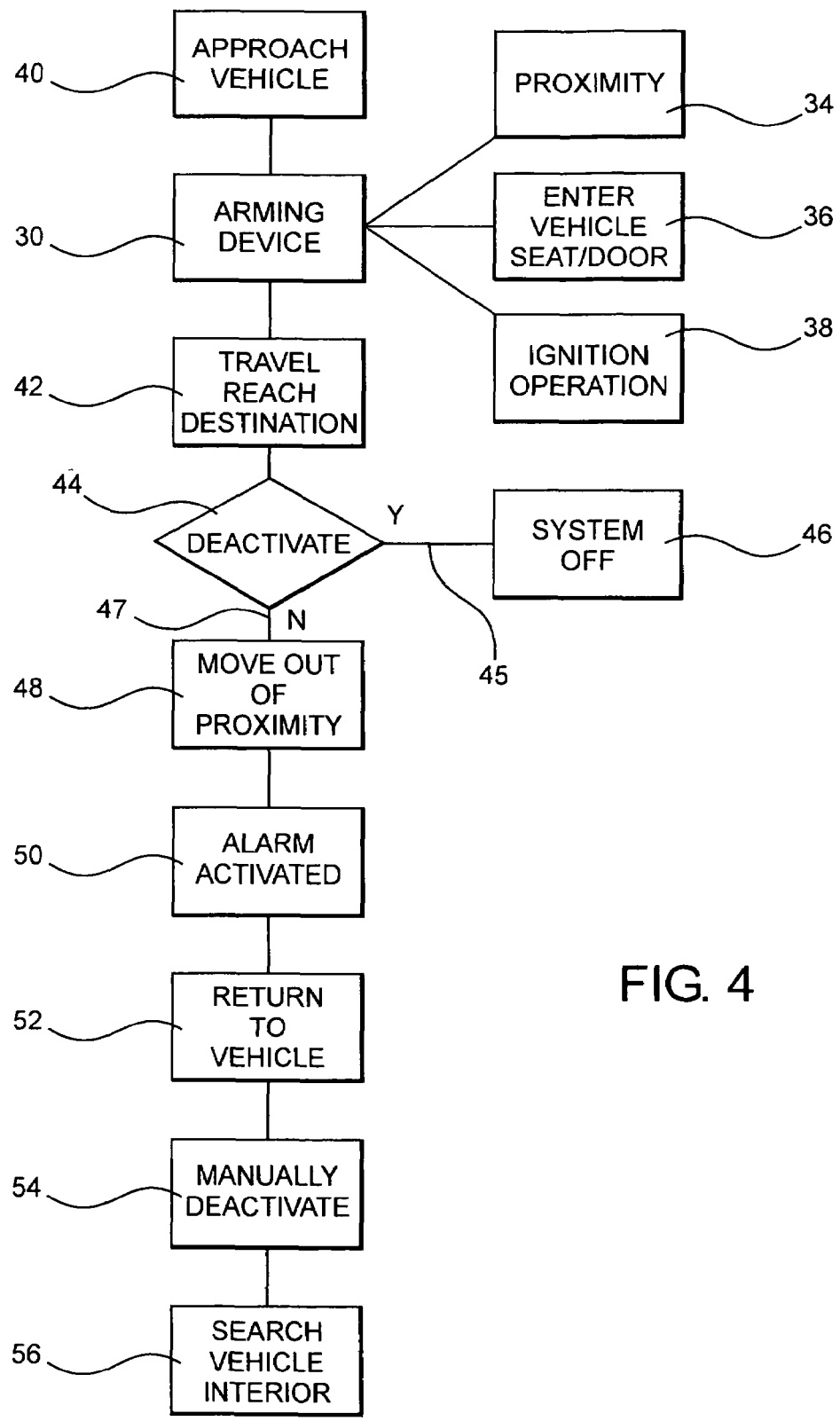
FIG. 4 is a schematic representation in block diagram form representing operation of the signaling system of the present invention.

For purposes of clarity, the operation and practical application of the signaling system 14 of the present invention will be demonstrated with primary reference to the schematic representation of FIG. 4. In describing the operation, it will be assumed that the sensor assembly 16 and therefore the signaling system 14 is initially at least partially deactivated and/or in the aforementioned sleep mode. Accordingly, an individual or operator approaches the vehicle 10 as at 40. Once passing the perimeter 12' and into the proximity area 12 the arming assembly 30 may serve to fully activate the sensor assembly 16 and accordingly render the signaling system 14 operative. Such will occur when the aforementioned activating condition 34 is applied, wherein the sensor assembly 16, even though in a partially deactivated or sleep mode, will determine the entry into the proximity area 12 causing the arming assembly 30 to change the condition of the sensor assembly 16 to a fully activated and armed state. As set forth above, any one of a plurality of different activating conditions as at 36 and 38 may occur to activate the sensor assembly 16 and signaling system 14 through operation of the arming assembly 30.

Once the system 14 is activated and assuming that the operator is within the vehicle 10 for purposes of traveling, the vehicle 10 will eventually reach its intended destination as at 42. The length of time of the travel of the vehicle 10 and/or the distance traveled is irrelevant in terms of maintaining the signaling assembly 14 and the sensor assembly 16 in a fully activated mode. However, upon reaching the destination, as at 42, the operator or other individual may choose to deactivate the signaling system 14 and sensor assembly 16, as at 44. If the system is deactivated, it will be turned off, as at 46, wherein the sensor assembly assumes an at least partially deactivated or "sleep" mode. However, it will be a common occurrence for the operator or other individual to not deactivate the signaling system 14, as at 47. Accordingly, as the individual leaves the vehicle 10 it is assumed that the operator will eventually move out of the proximity area 12 and beyond the perimeter 12' as at 48. When such occurs, the sensor assembly 16 will determine the individual has passed beyond the perimeter 12' and is no longer in the proximity area 12. The alarm assembly 18 and/or vehicle alarm system 23 will thereby operate to generate the reminder signal.

As set forth above, the demonstrable reminder signal will be of significant intensity to the extent that the operator or individual will be forced to return to the vehicle 10, as at 52, so as to deactivate the signaling system 14, sensor assembly 16 and/or alarm assembly 18, as at 54, by manual operation of the shut-off device 33. Concurrently, while the operator is within the vehicle 10, determination of whether a child, animal or perishable object was inadvertently left therein will most certainly occur, as at 56.

Therefore, simple yet effective operative and structural features of the signaling system 14 of the present invention serves to overcome many of the deficiencies and problems associated with known or conventional alarm and/or reminder systems associated with vehicles.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A system for generating a vehicle reminder signal, said system comprising:

a sensor assembly disposed on the vehicle and structured to monitor activity within a predetermined proximity area relative to the vehicle, an alarm assembly operatively connected to said sensor assembly and structured to produce a demonstrable reminder signal, a control assembly disposed on the vehicle and connected to said sensor assembly, said control assembly structured to activate and deactivate said sensor assembly, said sensor assembly and said alarm assembly cooperatively structured to generate said reminder signal upon occurrence of a predetermined activating condition within said predetermined proximity area, and said activating condition comprising a passage of an individual from the vehicle interior out of said predetermined proximity area;

wherein said control assembly further comprises an arming assembly structured to automatically activate said sensor assembly upon occurrence of at least one other activating condition comprising an entry into the vehicle by a person.

2. A system as recited in claim 1 wherein said alarm system is operative independently of a vehicle alarm system.

3. A system as recited in claim 2 wherein said alarm assembly is structured to produce an audible alarm defining said demonstrable reminder signal.

4. A system as recited in claim 2 wherein said sensor assembly and said alarm assembly are operatively interconnected by wireless communication.

5. A system as recited in claim 1 wherein said alarm assembly comprises an alarm system integrated into the operation of the vehicle.

6. A system as recited in claim 5 wherein said demonstrable reminder signal comprises an audible alarm.

7. A system as recited in claim 6 wherein said demonstrable reminder signal comprises a visual alarm.

8. A system as recited in claim 1 wherein said control assembly comprises a shut-off device manually operable to at least partially deactivate said sensor assembly.

9. A system as recited in claim 8 wherein said shut-off device is mounted on an interior of a passenger compartment of the vehicle.

10. A system as recited in claim 1 wherein said at least one activating condition comprises the presence of an individual within vehicle interior said.

11. A system as recited in claim 1 wherein said at least one activating condition comprises ignition operation of the vehicle.

12. A system for generating a vehicle reminder signal, said system comprising:

a sensor assembly disposed on the vehicle and structured to monitor activity within a predetermined proximity area relative to the vehicle, an alarm assembly operatively connected to said sensor assembly and structured to produce a demonstrable reminder signal, a control assembly connected to said sensor assembly, said control assembly structured to activate or at least partially deactivate said sensor assembly, said control assembly comprising a shut-off device disposed on an interior of the vehicle and manually operable to at least partially deactivate said sensor assembly, and said sensor assembly and said alarm assembly cooperatively structured to generate said reminder signal upon passage of an individual from the vehicle interior out of said predetermined proximity area; wherein said control assembly further comprises an arming assembly structured to automatically activate said sensor assembly upon occurrence of at least one of activating conditions comprising an entry into the vehicle by a person.

13. A system as recited in claim 12 wherein said activating condition comprises the presence of an individual within said vehicle interior.

14. A system as recited in claim 12 wherein said activating condition comprises ignition operation of the vehicle.

* * * * *